United States Patent Office 3,204,076
Patented Aug. 31, 1965

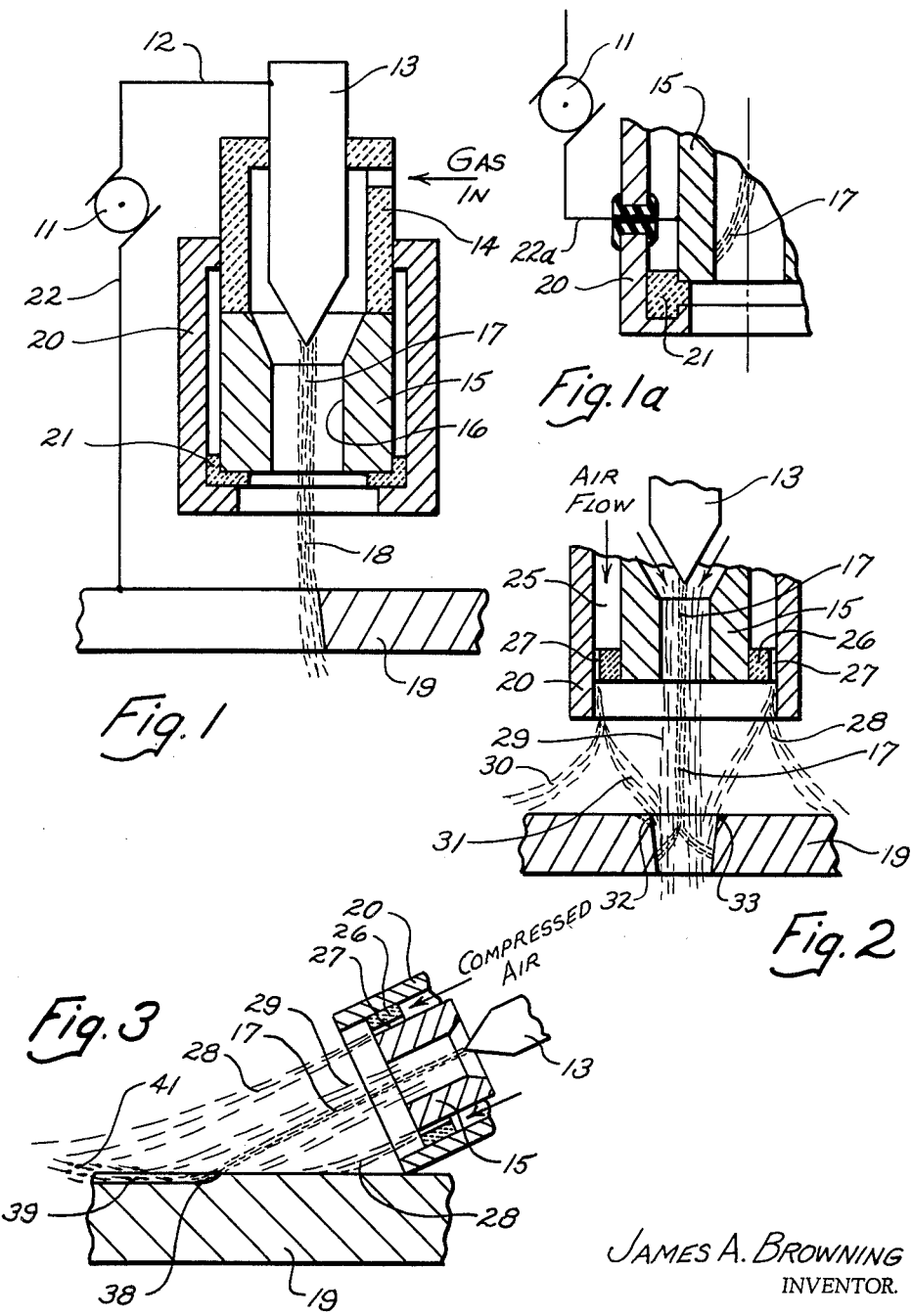

3,204,076
ELECTRIC ARC TORCH
James A. Browning, Hanover, N.H., assignor to Thermal Dynamics Corporation, Lebanon, N.H., a corporation of New Hampshire
Original application Oct. 4, 1962, Ser. No. 228,298. Divided and this application Dec. 23, 1964, Ser. No. 425,996
4 Claims. (Cl. 219—75)

My invention relates to electric arc torches and relates more particularly to an improved torch construction which reduces danger to operators and eliminates electrical shorting between nozzle and work, while at the same time increasing torch effectiveness under normal operating conditions.

Electric arc torches of the plasma forming gas type generally develop an arc between two electrodes. This arc is employed to reduce a gas, introduced along the arc stream, to a plasma state. While this "fourth state of matter" is not yet completely understood, extremely high effluent temperatures are developed and may be employed in a wide variety of commercial and scientific applications.

In accordance with this invention, I provide an electrically neutral shell to protect the torch nozzle and to prevent the arc from finding unwanted alternate paths from the cathode of the torch back to the power supply. To prevent molten slag or metal vapor from grounding this protective shell to the nozzle, I also provide a flow of gas, preferably air (for economic reasons) in the nozzle exit region.

For a complete understanding of my invention and the principles underlying its use, reference is now made to the following description and accompanying drawing, in which like reference characters denote like elements and in which:

FIGURE 1 is a simplified view, in cross section, of an arc torch embodying the improvements described herein;

FIGURE 1a is a detailed view of a circuit variation of the torch of FIGURE 1.

FIGURE 2 is a more detailed view of the nozzle end of a torch similar to the one shown in FIGURE 1 and containing an additional feature; and FIGURE 3 is a view, in section, of the torch of FIGURE 2 shown in use in a slotting or gouging operation.

Referring now more particularly to FIGURE 1, an arc torch of the general type described in U.S. Patent 3,027,446, issued March 27, 1962, to the present inventor, is illustrated having a cathode 13 held in an insulating holder 14. The cathode 13 is held in spaced relation to a nozzle 15 having an arc passage 16 therein. An arc 17 emanates from the cathode 13 and travels through arc passage 16 to impinge on a workpiece 19 which acts as the anode in the circuit. Leads 12 and 22 complete the electrical path to a suitable power supply 11. The arc 17 is stabilized and forced down the passage 16 by a gas, preferably a plasma forming gas, which is heated at it travels along with the arc stream.

FIGURE 1 shows this torch in what is called the transferred mode of operation; that is, the arc leaves the torch per se and an external work piece acts as the anode. In the nontransferred mode the nozzle 15 serves as the anode, the arc thus terminating down the passage 16 against the inner wall thereof. In such case the electrical circuit is completed by a lead 22a (FIGURE 1a) and the useful work of the torch is done solely by the plasma and hot gas effluent. Whether the mode is transferred or nontransferred the invention is equally applicable.

To return to FIGURE 1, an outer shell 20 completely surrounding the nozzle 15 is provided. This shell is anchored to the torch by being attached at insulated holder 14 and at the exit end of the nozzle with an insulating counter-bored ring 21. It will be seen that the shell 20 is electrically isolated from all other torch components.

The phenomenon of "arc shortage" can occur when the nozzle 15 makes inadvertent electrical contact with the work piece. An electrical path is then established by conduction through the nozzle material thus damaging the torch, or, at the least, rendering it ineffective as a working tool. My shell 20 prevents this action and is particularly useful in small hand-held torches where careless handling often causes unwanted arc shorting.

I have found that the effectiveness of protective shell 20 is further enhanced by the construction shown in FIGURE 2. Here is provided an insulating ring 26 as before. However, I have found in some types of work, particularly where the torch is in close proximity to the surface being operated on, that slag, molten droplets, and even metal vapor may contaminate the end of the torch, forming a metallic conducting bridge between the nozzle 15 and the shell 20. This circumstance, of course, renders the shell 20 no longer electrically neutral and the disadvantages of unprotected torches are again experienced.

To prevent the formation of such conducting bridges, I form slots 27 in the insulating ring 26. Then into the chamber 25 between the nozzle 15 and the shell 20 a gas is supplied under suitable pressure. It should be understood that this gas is separate and distinct from the arc stabilizing gas introduced at the cathode 13 and flowing in the arc passage 16. Thus air may be employed as it is fully effective for this purpose and very inexpensive. The flow of air through slots 27 effectively scavenges the inner surface of the shell 20 in the area where metallic depositions, freezing on exposed portions of the torch, would otherwise connect the shell 20 electrically to the nozzle 15.

This air flow, in addition to keeping the shell 20 neutral, also provides some unexpected benefits when using the torch for cutting, as in FIGURE 2. In cutting it is usually desirable to form straight sided kerfs. It has been common practice to make cuts in which a rounding of the work, as shown in the dotted lines 33, is the inevitable, unwanted result. This is because the plasma effluent 29 tends to spread and the heating effect extends well beyond the desired zone of the cut.

In my device, the cold gases 28 flowing through slots 27 impinge on the surface of the work and divide as shown at 30 and 31. The flow at 31 serves to cool the corner of the kerf at 32 and aid in keeping that corner sharp. Furthermore this flow at 31 tends to contain the plasma effluent 29, and drive it deeper into the cut where the thermal energy invested in the gas is delivered to the work as desired. A further added advantage of the air flow is that it aids in sweeping the slag from the work piece 19.

In FIGURE 3 I show the torch being used in a metal gouging operation. Here, because of the insulating protective shell, the torch body may actually touch the work piece 19, in getting the effluent extremely close to the area to be treated. The flow of gas at 28 keeps the plasma directed in a coherent stream, while acting mechanically to remove the molten material and slag 41 produced.

In providing two separate gas flows, one essentially electro-stabilizing and plasma forming, and the other essentially mechanical in action, the operator can choose a flow in each case best suited to its respective purpose substantially without regard to the values of the other. Prior arc torches do to some extent rely on the mechanical action of the gas stream, but the particular advantages discussed herein are not realized. Further, the electrically neutral shell acts as a protective shield, combining a Modifications within the spirit and scope of the following claims may occur to persons skilled in the art.

I claim:
1. An electric arc torch comprising at least one electrode, a nozzle having an arc passageway extending from said electrode, means for establishing an arc from said electrode, gas stabilizing means to carry said arc through said passageway, a protective shell surrounding said nozzle, a spacer ring electrically insulating said shell from said nozzle, a plurality of apertures in said ring and around the circumference thereof communicating with the space within said shell, and means for providing a flow of gas through said apertures.

2. An electric arc torch comprising a first electrode, a second electrode in the form of a nozzle having an arc passageway therein extending from said first electrode, means for establishing an arc between said electrodes, first gas means for stabilizing said arc in said passageway, a protective shell electrically insulated from and surrounding said second electrode and extending beyond the opening in said nozzle, and second gas means providing an annular sheath flowing from the inner surface of said shell along the axis of said nozzle.

3. An electric arc torch comprising at least one electrode, a nozzle having an arc passageway extending from said electrode, means for establishing an arc from said electrode, gas stabilizing means to carry said arc through said passageway, a protective shell electrically insulated from and surrounding said nozzle and extending beyond the opening in said nozzle, and second gas means providing an annular sheath flowing from the inner surface of said shell along the axis of said nozzle.

4. An electric arc torch comprising a first electrode, a second electrode in the form of a nozzle having an arc passageway therein extending from said first electrode, means for establishing an arc between said electrodes, gas means for stabilizing said arc in said passageway, a protective shell surrounding said nozzle, a spacer ring electrically insulating said shell from said nozzle, a plurality of apertures in said ring and around the circumference thereof communicating with the space within said shell, and means for providing a flow of gas through said apertures.

References Cited by the Examiner

UNITED STATES PATENTS

| | | | |
|---|---|---|---|
| 2,417,650 | 3/47 | Kandel | 219—70 |
| 2,858,412 | 10/58 | Kane et al. | |
| 2,868,950 | 1/59 | Gage | 219—74 |
| 2,922,024 | 1/60 | Cresswell | 219—74 X |
| 3,121,784 | 2/64 | McGinty et al. | 219—75 |
| 3,130,292 | 4/64 | Gage et al. | 219—121 X |

ANTHONY BARTIS, *Acting Primary Examiner.*
JOSEPH V. TRUHE, *Examiner.*